United States Patent [19]

Suzuki et al.

[11] 4,235,274
[45] Nov. 25, 1980

[54] TREAD REINFORCING CONSTRUCTION OF PNEUMATIC RADIAL TIRE FOR HEAVY-LOAD VEHICLES

[75] Inventors: Yasuo Suzuki, Akigawa; Masaru Abe, Kodaira; Toshiro Tezuka, Higashi-Murayama, all of Japan

[73] Assignee: Bridgestone Tire Co., Ltd., Tokyo, Japan

[21] Appl. No.: 237

[22] Filed: Jan. 2, 1979

Related U.S. Application Data

[63] Continuation of Ser. No. 768,449, Feb. 14, 1977, abandoned.

[30] Foreign Application Priority Data

Feb. 13, 1976 [JP] Japan .................................. 51/14542

[51] Int. Cl.³ ............................................... B60C 9/18
[52] U.S. Cl. .................................. 152/354 R; 152/359; 152/361 DM; 428/371
[58] Field of Search ........... 152/360, 361 R, 361 DM, 152/361 FP, 356, 359, 374; 57/140 R, 139, 144; 428/295, 371, 398, 217

[56] References Cited

U.S. PATENT DOCUMENTS

| | | |
|---|---|---|
| 3,133,583 | 5/1964 | Dobson .......................... 152/361 DM |
| 3,273,978 | 9/1966 | Paul ................................. 428/295 X |
| 3,392,774 | 7/1968 | Bosse ..................................... 152/361 |
| 3,503,432 | 3/1970 | Maiocchi ....................... 152/361 DM |
| 3,504,724 | 4/1970 | Sperberg ..................... 152/361 R X |
| 3,598,165 | 8/1971 | Hanus ............................... 152/361 R |
| 3,631,667 | 1/1972 | Marzocchi ........................ 57/144 X |
| 3,831,656 | 8/1974 | Senger .......................... 152/361 FP |
| 3,902,542 | 9/1975 | Imamura ........................... 152/361 R |
| 3,982,580 | 9/1976 | Inoue et al. ................... 152/361 DM |

FOREIGN PATENT DOCUMENTS

2096405 2/1972 France ................................. 152/361 R

Primary Examiner—John J. Love
Assistant Examiner—D. W. Underwood
Attorney, Agent, or Firm—Sughrue, Rothwell, Mion, Zinn and Macpeak

[57] ABSTRACT

A tread reinforcing construction of a pneumatic radial tire for heavy-load vehicles is disclosed. The tread reinforcing construction comprises a combination of a rubberized belt superimposed about a rubberized carcass ply and at least one additional rubberized reinforcing layer interposed between the belt and a tread rubber. The additional rubberized reinforcing layer is composed of a reinforcing element embedded therein and formed of a helically formed filament or a bundle of at least two helically formed filaments assembled together without twisting at random.

9 Claims, 15 Drawing Figures

TREAD REINFORCING CONSTRUCTION OF PNEUMATIC RADIAL TIRE FOR HEAVY-LOAD VEHICLES

This is a continuation, of application Ser. No. 768,449, filed Feb. 14, 1977, abandoned.

This invention relates to pneumatic tires for heavy-load or off-road vehicles such as a truck, bus or construction vehicle, etc., and more particularly to a tread reinforcing construction for a radial tire reinforced by a belt superimposed about a carcass ply containing cords arranged in parallel or substantially parallel with radial direction of the tire and composed of a plurality of metal cord plies and having a high rigidity in circumferential direction.

Such kinds of pneumatic tires for heavy-load vehicles are required to have improved resistance to wear, cut resistant property and heat resistant property or high speed durability.

The requirements that tires must run at a higher speed, carry a more heavy load and endure long time use are not limited to the above mentioned tires for heavy-load vehicles. Such industrial products as tires for heavy-load vehicles, however, exert a direct influence upon the gain of a profit making enterprise and hence must strictly satisfy the above mentioned requirements.

In order to satisfy the above mentioned requirements, a radial or semi-radial tire comprising a carcass ply containing cords arranged in parallel or substantially parallel with the radial direction of the tire and a plurality of belts arranged at a crown portion of the tire and superimposed about the carcass ply, the belt having a high rigidity in circumferential direction has heretofore been used in place of a bias tire comprising carcass containing a number of textile cords inclined with respect to the equatorial line of the tire.

The bias tire has a constructional feature that when the tire is subjected to load, the carcass changes configuration. As a result, generation of heat in a tread portion increases to degrade the heat resistant property of the tire. In order to prevent such drawbacks, if the tread is made thin in gauge, the cut resistant property and worn out life of the tire lessens.

In order to improve the cut resistant property, it has been proposed to provide a bias tire comprising a plurality of breakers interposed between a tread and a textile bias carcass and composed of cords having a large rigidity such as steel cords. However, experience has proved that the heat resistance of such bias tire is inferior to that of a bias tire comprising a breaker portion composed of textile cords only.

The use of a simple combination of a belt interposed between a thread and a carcass and having a high rigidity and a carcass ply containing cords arranged in radial or substantially radial direction (such carcass inclusive of a semi-radial carcass will hereinafter be called as a radial carcass) ensures a decrease in movement of a tread surface during running of the tire and provides the advantage that the tire has excellent resistance to wear, and that the cut failure pierced through the tire is small. Since the carcass is thin and movement thereof is not complex, generation of heat in the carcass and belt decreases and hence the tire has excellent high speed durability.

Such radial tire which is conceivable as of an all-round ideal one has involved unexpected drawbacks when the tire runs under heavy-load or on off-road. That is, when the tire runs under heavy-load, the belt cords break due to fatigue and when the tire run on off-road, cut separation occurs.

When off road vehicles run under heavy-load, the flexure of the tire becomes considerably larger than that of passager cars, and as a result, the contact area of the tread with ground is increased.

An increase of the contact area of the tread with ground results in an increase of the length of the tread in contact with ground in its circumferential direction since the maximum tread width is given. In this case, the high rigidity of the belt in its circumferential direction causes a compressive force to be exerted to the belt from both ends thereof in the circumferential direction in the contact area with ground toward the center of such area. The compressive force functions to forcibly deform the belt in its contact area with ground into an arcuate-shape with respect to the road surface. The metal cords located near the tread are subjected to severe influence of such deformation of the belt.

That part of the belt is immediately subjected to tension due to the internal pressure applied into the tire when it is separated from the contact area with ground. As a result, the belt is repeatedly subjected to compression and tension. In particular, the metal cords become fatigued and broken due to bending caused by compression.

On one hand, when the radial tire runs on off-road and rides on rocks, the belt whose rigidity is far larger than that of the breaker of the bias tire, functions to envelop the rock to a less extent, so that the tread is liable to be subjected to scratches on the surface thereof. In addition, a large difference in rigidity between the belt and the tread produces a large stress therebetween. If the tread gauge is thick, the maximum point of this stress is concentrated in the tread. If the tread becomes worn and its gauge is decreased, all of the stress is produced near the outer surface of the belt. This is because of the fact that since the belt has a large rigidity, the stress is not extended into the interior of the belt. In this way, the tread is liable to be subjected to the surface cut. If the surface cut of the tread is extended into the belt and if the cord is formed of steel, the steel cord becomes rusted due to its contact with water penetrated through the cut thereinto. As a result, the tread is separated from the belt by traction produced when the tire in use, thereby producing a so-called cut separation and considerably shortening the overall life of the tire.

An object of the invention is to provide a pneumatic radial tire for heavy-load vehicles, which can eliminate the above mentioned drawbacks which have been encountered with the prior techniques and which has improved resistance to wear, cut resistant property and heat resistant property or high speed durability, which is long in life and which is especially suited for heavy-load and off-road vehicles.

A feature of the invention is the provision of a tread reinforcing construction of a pneumatic radial tire for heavy-load vehicles, which is characterized by the following features. A. A belt layer having a high rigidity is arranged at a crown portion of the tire and superimposed about a carcass layer containing ply cords arranged in parallel or substantially parallel with radial direction of the tire, the belt layer being formed of a plurality of metal cords having an excellent cut resistant property and laminated one upon the other, thereby maintaining a cut resistant property and resistance to wear in a sufficiently high level. B. Between the belt and a tread rubber is interposed at least one additional reinforcing layer composed of a reinforcing element formed of a helically formed filament or a bundle of at least two helically formed filaments assembled together without twisting at random and embedded in rubber. The helically formed filament is made of a material having a tensile breaking strength of at least 140 kg/mm$^2$ and the reinforcing element having an elongation at tensile breaking strength which is at least 1.2 times larger than the smallest elongation at tensile breaking strength of those layers of the belt which consist of main layers thereof. The whole rigidity of the additional reinforcing layer in circumferential direction is smaller than that of the belt and as a whole the additional reinforcing layer having elasticity and compressibility.

The invention will now be described in greater detail with reference to the accompanying drawings, wherein.

The inventors' recognitions how to prevent breakage and cut separation of metal cords of a belt of a radial tire which ocured when the tire travels on off-road under heavy loaded condition are as follows.

If the rigidity of the belt is made low so as to increase its enveloping power, it is possible to attain the above mentioned object. The use of such a measure, however, results in a degradation of resistance to wear and heat resistant property or high speed durability, these properties being inherent to the radial tire. Under such circumstances, the breakage and cut separation phenomena of the metal cord will now be observed in greater detail.

In the first place, the breakage of the metal cord, that is, buckling thereof, occurs at that portion of the belt which is near its outermost layer. The more the number of layers of the belt and the larger the deformation of the belt, the more the dimension of buckling.

Figure 1:
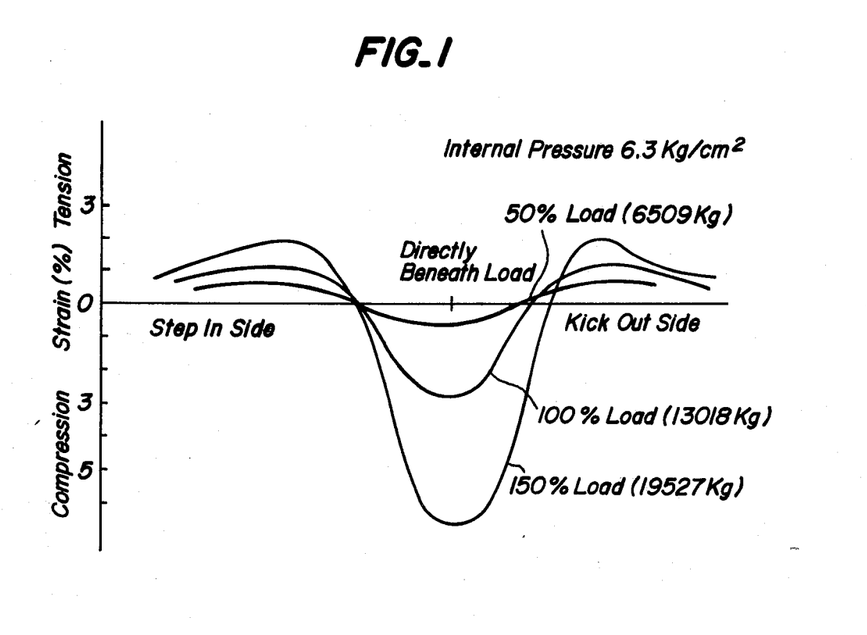
FIG. 1 is a graph illustrating tensile and compressive strains produced in cord direction of an outermost belt when the tire is used under loaded condition.

FIG. 1 shows strain in % in cord direction of the outermost layer of a belt formed of 6 layers laminated one upon the other of a radial tire having a size of 21.00 R 35.

If the tire is subjected to 150% load defined by Tire and Rim Association year book published in U.S.A., the belt cord directly beneath the load is subjected to 7% strain.

On the one hand, the tire is subjected at its kick out side to tension, and as a result, the belt is subjected to repeated strain and stress consisting of compression-tension.

The greater the number of belt plies laminated one upon the other and the larger the load subjected to the tire, the larger the repeated strain subjected to the belt.

This is because since the belt has a high rigidity, the belt in the contact area with ground of the tire tends to be bent into an arcuate-shape. Then, the belt is subjected to tension at its carcass side and compression at its tread side. When the tire is inflated by the internal pressure applied therein, all of the belt plies are subjected to tension, so that the belt cord at the tread side is fatigued by repeated tension-compression strain during one rotation of the tire. As a result, the metal cord composed of conventional steel wires having a large compression modulus of elasticity breaks.

The inventors have found out that if cords which can withstand the compressive force are used for the outer layer portion of the belt, the above described repeated tension-compression strain can be alleviated.

In addition, the inventors have found that the cut separation can be prevented if provision is made of a tread which satisfies the following conditions, i.e.

(1) the tread has an elongation and tensile breaking strength which are sufficient to alleviate stress produced when the tire rides on rocks and withstand breakage of the tire, (2) even if the tread is subjected to cut scratches and water tends to be penetrated through the cut scratches into the tire, these cut scratches are not communicated with each other, and (3) the tread has an elongation modulus of elasticity that is sufficient to prevent tread from being broken by extensible force produced due to partial deformation of the tread when the tire rides on rocks.

The inventors have investigated on the basis of the above recognitions a tread reinforcing construction and material suitable for such construction which can satisfy the above requirements.

The inventors have studied a helically formed filament described in U.S. Pat. No. 3,682,222. Such helically formed filament possesses properties to be described later. In the above U.S. Patent Specification, the helically formed filament is merely used as a belt material for a radial tire or belted bias tire. But, such use could not attain the object of the prevent invention. Because, the belt material formed of the helically formed filament merely functions as a tension member in the circumferential direction of a pneumatic tire and is substantially inextensible, and as a result, such belt material could not respond to the exterior deformation of the tire and hence could not attain the object aimed at the present invention.

The inventors have recognized that an optimum combination of a belt composed of a conventional steel cord and a reinforcing layer composed of a helically formed filament can prevent the cord breakage due to cut separation and fatigue failures without deteriorating the advantages inherent to the radial tire construction per se.

In accordance with the invention, in order to attain the object aimed at that portion of the belt which is located near the carcass is composed of a conventional steel cord having a small elongation so as to obtain circumferential rigidity of the belt which is required for a radial tire and about the belt is superimposed an additional reinforcing layer composed of a helically formed filament which is rich in elongation and can withstand compression fatigue.

The helically formed filament may be formed of steel and other metals having a high cut resistant property or glass or organic materials. A material such as nylon, rayon and the like used usually as the tire cord and having a tensile breaking strength on the order of 80 to 110 kg/mm² is substantially unsuitable as the cut resistant material. It has been found that the object of the invention can be achieved by using a cut resistant material having a tensile breaking strength of at least 140 kg/mm², preferably 170 kg/mm² and 190 kg/mm² or more when a maximum cut resistant property is required.

The reasons why a tensile breaking strength of at least 140 kg/mm² is required for the cut resistant material are as follows. If the tensile breaking strength is smaller than 140 kg/mm², the cut resistant material becomes broken by the exterior cut to expose the underlying conventional belt. Then, the tire functions in the same manner as the conventional radial tire and hence could not attain the object of the invention.

If the number of cords per unit length is increased for the purpose of improving the cut resistant property of the tire, the cords adhere with each other, thereby tending to communicate the cut scratches with each other and hence produce the cut separation. The use of such measure, therefore, could not attain the object of the present invention.

In order to prevent the cut breakage of the tire, it is preferable to interpose a rubber sheet having a thickness of at least 0.5 mm between a conventional belt and a reinforcing layer composed of helically formed filaments or to make the coating rubber thickness of the above described reinforcing layer thick, that is, an amount of the coating rubber with respect to the effective area of the steel cord per unit width is made larger than that of the conventional steel cord belt, preferably on the order of 1.3 times larger than that of the latter. The use of such measures ensures an absorption of stress due to the cut, thereby alleviating the force subjected to the belt.

In the radial tire according to the invention, use is made of a carcass ply composed of at least one rubberized ply formed of metal cords, preferably steel cords or organic fiber cords. In all of these carcass plies, the ply cords are arranged in parallel with or inclined at a small angle with the radial direction of the tire to constitute so-called radial or semi-radial construction. The belt is superimposed about the carcass ply and use is made a belt composed of at least two rubberized plies containing metal cords, preferably steel cords and having a high tensile breaking strength and a small elongation. At one ply containing cords having a tensile breaking strength of at least 190 kg/mm² and an elongation at breaking strength of at most 5% constituting a main layer of the belt and inclined at a small cord angle with respect to the circumferential direction of the tire is sued. At least one of the main layer of the belt contains cords arranged at an angle of at most 30° with respect to the circumferential direction of the tire.

By taking the other properties into consideration, any suitable cord angle may be selected as in the case of the conventional radial belt.

Before describing in greater detail the configuration and effect of an additional reinforcing layer to be interposed between the belt and the tread and composed of helically formed filaments, the configuration and construction of a reinforcing element used in the present invention will now be described.

In the present invention, use is made of a flexible and permanently helically formed relatively fine filament formed of a material having a tensile breaking strength within the above described range and having a diameter which is larger than 0.1 mm, preferably 0.13 mm and smaller than 1.0 mm. At least 2 and at most 50, preferably at least 3 and at most 30 of these filaments are assembled together at random without twisting into a bundle, that is, assembled together without aligning helical configurations with each other, the bundle being used in cord-shape.

Figure 2A:
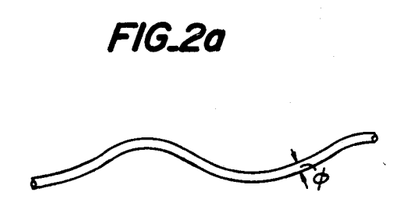
FIG. 2a is a side elevation of a helically formed filament for constituting a reinforcing element according to the invention.
Figure 2B:
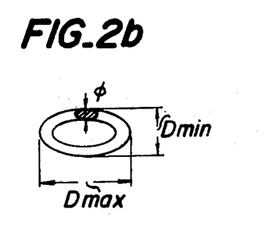
FIG. 2b is its end view showing a ratio of the maximum diameter Dmax projected on a plane perpendicular to an axial direction of one pitch of a helically formed filament to the minimum diameter Dmin thereof.

FIG. 2a shows a side elevation of the helically formed filament and FIG. 2b shows a section projected on a plane perpendicular to the axial direction of one pitch of the helically formed filament shown in FIG. 2a. The ideal shape of the outer contour projected on a plane perpendicular to the axial direction of one pitch of the helically formed filament should be a true circle for the purpose of equalizing the stress subjected to it. It is not only technically difficult to form such true circle, but also it is more difficult that such helically formed filaments maintain true circle by taking into consideration that the filaments are incorporated into the tire through a number of working steps. As a result, it is difficult to maintain the section of the helically formed filament in true circle in the finished tire.

A number of experimental tests and studies on practically allowable deviation from the true circle have shown that if a ratio of a maximum diameter (Dmax) of an outer contour projected on a plane perpendicular to the axial direction of one pitch of the helically formed filament to a minimum diameter (Dmin) thereof lies within a range to be described later at any position in the crown portion of the tire, the stress subjected to the outer contour becomes substantially uniformly distributed, and that hence premature fatigue breakage is not induced. That is, in FIG. 2b, a ratio of the maximum diameter Dmax to the minimum diameter Dmin, i.e., $$\frac{D_{max}}{D_{min}}$$

is required to lie within a range of 1 to 1.5. In addition, an average diameter D, that is, $$\frac{D_{max} + D_{min}}{2},$$

of the helically formed filament should be $2\phi$ to $20\phi$, preferably $3\phi$ to $15\phi$, $\phi$ being the diameter of the helically formed filament.

As a method of obtaining a desirous elongation of filaments each formed of material having a high tensile breaking strength, for example, high carbon steel and assembled together without twisting, it might be possible to arrange filaments in parallel with each other in the same plane. In this case, however, stress becomes concentrated into bent portions of the undulate filament in response to extension and compression in the lengthwise direction thereof. In addition, this stress is a bending stress to be concentrated into a part of the cross section of the filament, so that these frequently induce the premature fatigue breakage at the bent portions of the filament. As a result, it has been found out that such undulate filaments could not be used in place of the helically formed filament in practice.

On the contrary, the use of the helically formed filament ensures a necessary elongation. In this case, the stress produced in response to the extension or compression in the lengthwise direction of the helically formed filament is substantially uniformly distributed over any portion in the lengthwise direction thereof. In addition, the above mentioned stress is a torsional shearing stress which is liable to be easily distributed in a relatively uniform manner over the cross section of the filament, so that it is possible to completely prevent the fatigue breakage.

The inventors' study has demonstrated that the diameter $\phi$ of the helically formed filament should preferably be thin for the purpose of preventing breakage due to cord fatigue. In addition, it is possible to increase the strong force per unit area of the helically formed filament formed of the same material by drawing it and hence improve the cut resistant property thereof, so that it is preferable to use a filament whose diameter $\phi$ is small. But, the use of a filament whose diameter $\phi$ is smaller than 0.1 mm results in occurrence of cuts of the filaments in non-allowable frequency in the step of shaping the helically formed filament and hence the use of such filament is not economical.

On the contrary, if use is made of a filament whose diameter $\phi$ is larger than 1.0 mm, internal stress produced in the filament during the step of shaping the helically formed filament becomes excessively large. In addition, torsional shearing stress which occurs when extension or compression is subjected to the filament in its lengthwise direction is concentrated into the outer contour portion. As a result, the cross sectional area required for maintaining the strength which is sufficient to resist against the same exterior force becomes larger than that necessary for the thin filament, thereby requiring large amounts of material. Thus, the use of a filament having a diameter $\phi$ larger than 1.0 mm is not economical.

As seen from the above, the diameter $\phi$ of the filament is required to lie within a range from 0.1 mm to 1.0 mm.

The relation between the diameter $\phi$ of the filament and the average diameter D of the outer contour projected on a plane perpendicular to the axial direction of one pitch of the helically formed filament will now be described. If D is smaller than $2\phi$, the pitch of the helically formed filament is required to be excessively short for the purpose of obtaining the desired elongation. As a result, the cut of filaments frequently occurs in non-allowable frequency in the same manner as in the case of using the filament whose diameter $\phi$ is excessively small. At the same time, the internal stress produced when the filament is helically formed becomes excessively large.

On the contrary, if D is larger than $20\phi$, the gap formed between the most protruded portions of two adjacent helically formed filaments arranged in the tire as its cord-shaped reinforcing element becomes too small to define the distance therebetween which is required for maintaining the desired separation resistant property, and as a result, sufficiently large cut resistant property could not be obtained. On the contrary, if it is desired to obtain the sufficiently large cut resistant property, the above mentioned distance required between the two adjacent elements could not be obtained, so that a sufficiently high separation resistant property could not be obtained. In addition, in order to obtain the sufficiently high separation resistant property, not only the above mentioned distance required between the two adjacent helically formed filaments, but also the distance between the tread rubber and the reinforcing element and the distance between the reinforcing element and the carcass in the case of one rubberized layer containing the reinforcing element are required to be kept within a certain range. In addition, in the case of at least two rubberized layers, the distance between the two adjacent reinforcing elements must also be kept within a certain range. Moreover, the last mentioned distance is required to be measured between the most protruded portions of the two adjacent reinforcing elements, so that it is necessary to use a thick rubberized layer containing the reinforcing element embedded therein, thereby significantly impeding economy. As seen from the above, the average diameter D of the helically formed filament should be 2 to 20 times larger than the diameter $\phi$ of the filament.

The pitch of the helically formed filament is suitably selected in association with the modulus of elasticity, diameter $\phi$ and average diameter D of the outer contour projected on a plane perpendicular to the axial direction of one pitch of the helically formed filament for the purpose of obtaining optimum elongation at breaking strength and modulus of elasticity required for the use of the tire.

The number of helically formed filaments adapted to be assembled together at random without twisting so as to provide the reinforcing element will now be described. If use is made of one helically formed filament, the diameter $\phi$ thereof becomes excessively large for the purpose of obtaining the required cut resistant property of the tire. As a result, the above mentioned problem is involved and at the same time the effect of improving reinforcing element-to-rubber bonding force will be decreased. On the contrary, if use is made of more than 50 helically formed filaments, the diameter of the bundle of the helically formed filaments becomes excessively large even though the average diameter D of the helically formed filament is small. As a result, the same problem occurs as in the case of making the average diameter D excessively large. As seen from the aove, the number of helically formed filaments adapted to be assembled together without twisting at random to provide the reinforcing element is suitably selected into a range between 2 and 50, preferably 3 to 30, by taking a balance between the cut resistant property and other characteristics required for the use of tires on the one hand and economy on the other hand into consideration.

The relation between the forces subjected to the reinforcing element constructed as above described according to the invention and to a conventional stranded steel cord on the one hand and elongation thereof on the other hand will now be described with reference to a practical example.

Figure 3:
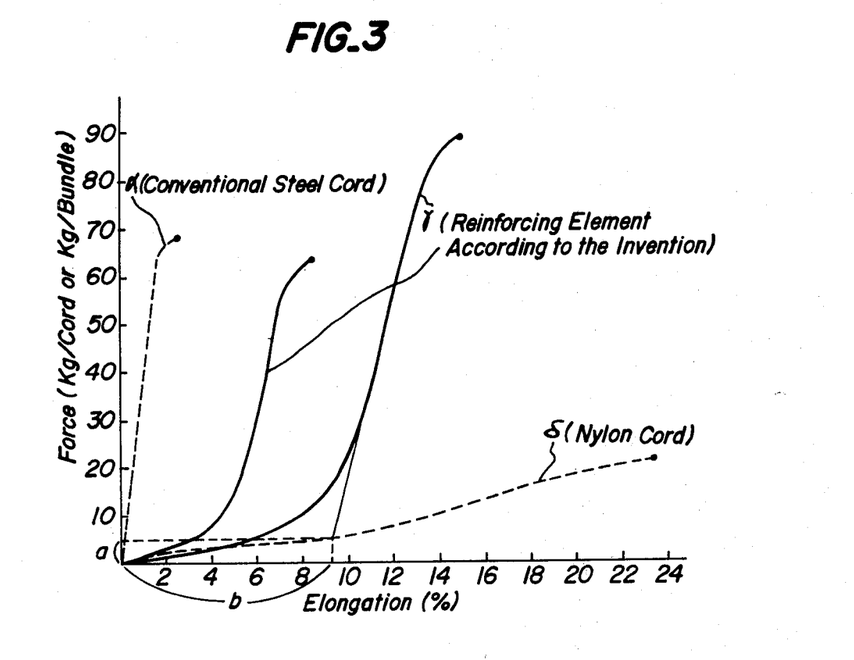
FIG. 3 is a graph illustrating tensile test results yielded from a reinforcing element according to the invention as compared with those yielded from a conventional steel cord and nylon cord.

In FIG. 3 are shown tensile test results with the force in kg/cord or kg/bundle taken on the ordinate and with the elongation in % on the abscissa. In FIG. 3, a dotted lines curve α shows a tensile test result obtained from a conventional steel cord having a strand construction of 1×5, cord diameter of 0.25 mm and strand diameter of 0.68 mm and full line curves β and γ show tensile test results obtained from reinforcing elements of the additional reinforcing layer according to the invention. The tensile test result shown by the full line curve β was obtained from a reinforcing element composed of a bundle formed of 5 steel helically formed filaments each having a filament diameter φ of 0.25 mm, average diameter D of 0.95 mm, $$\frac{Dmax}{Dmin} = 1.25, \frac{D}{\phi} = 3.8,$$

and pitch of 10.5 mm. The tensile test result shown by the full line curve γ was obtained from a reinforcing element composed of a bundle of 14 steel helically formed filaments each having a filament diameter φ of 0.175 mm, average diameter D of 1.1 mm, $$\frac{Dmax}{Dmin} = 1.20, \frac{D}{\phi} = 6.3$$

and pitch of 11 mm. In FIG. 3, a dotted lines curve δ shows a tensile test result obtained from a conventional nylon cord (1,260 denier/2 strands).

As seen from FIG. 3, the reinforcing elements for the additional reinforcing layer according to the invention provide a relation between the force subjected to the reinforcing elements and the elongation thereof that the elongation within a proportional limit is greater than that of the conventional steel cord. That is, the reinforcing elements according to the invention show a larger elongation when a small force is subjected thereto.

The elongation characteristic of the reinforcing element required for preventing the cut separation is that to be produced at the initial step. At this initial step, the reinforcing element composed of a bundle of helically formed filaments has a small modulus of elasticity. Thus, it will be understood that the use of such a reinforcing element is ideal for tires in which the elongation characteristic within the proportional limit is quite important.

In addition, a bundle of helically formed filaments constituting the reinforcing element of the additional reinforcing layer according to the invention has a modulus of elasticity a/b (FIG. 3) within the proportional limit which is smaller than that of the conventional steel cord.

It is preferable that the modulus of elasticity a/b of the reinforcing element of the additional reinforcing layer is at most $5 \times 10^3$ kg/mm².

The use of a reinforcing element composed of helically formed filaments ensures a decrease of compressive modulus of elasticity. As a result, it is possible to absorb the compressive force instantaneously and continuously exerted to the exterior layer of the reinforcing layer, thereby eliminating repeated bendings, etc. and hence considerably reducing occurrence of breakage of the cords.

The difference between the compressive modulus of elasticity and the compressive fatigue property of the reinforcing element for the additional reinforcing layer according to the invention and those of the conventional stranded steel cord for belts will now be described with reference to practical examples.

Figure 4:
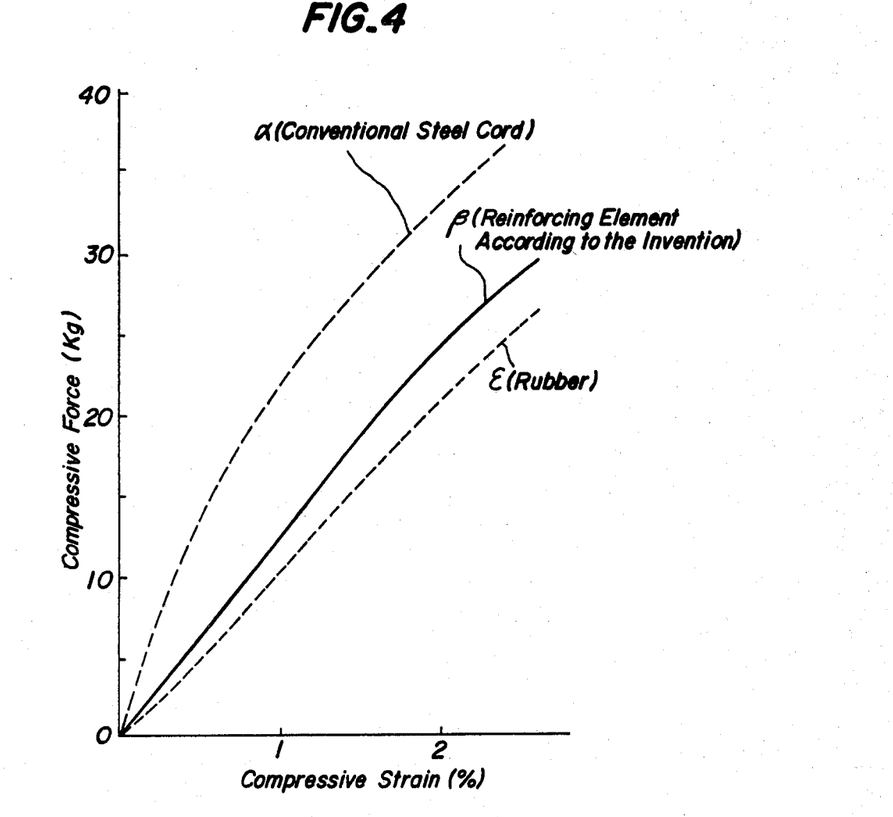
FIG. 4 is a graph illustrating compression test results yielded from a reinforcing element according to the invention as compared with those yielded from conventional steel cord and rubber.

FIG. 4 shows compression test results. In FIG. 4, the compressive force in kg is taken on the ordinate and the compressive strain in % is taken on the abscissa. In this test, use was made of two test pieces, one of which being composed of a cylindrical rubber containing one conventional stranded steel cord embedded therein and the other being composed of a cylindrical rubber containing one bundle of the reinforcing element according to the invention embedded therein.

In FIG. 4, a dotted lines curve α shows the relation between the compressive force in kg subjected to the conventional steel cord having a stranded construction of 1×5, filament diameter φ of 0.25 mm and cord diameter of 0.68 mm and the compressive strain in % produced therein. A full line curve β shows the relation between the compressive force in kg subjected to the reinforcing element of the additional reinforcing layer according to the invention composed of 5 steel helically formed filaments each having a diameter φ of 0.25 mm, average diameter D of 0.95 mm, $$\frac{Dmax}{Dmin} = 1.25, \frac{D}{\phi} = 3.8$$

and pitch of 10.5 mm and the compressive strain in % produced therein. A dotted lines curve ε shows the same relation with respect to a test piece formed of rubber only. It is a matter of course that rubber of all of these three test pieces is of the same rubber compound.

As seen from FIG. 4, the compressive modulus of elasticity of the reinforcing element of the additional reinforcing layer according to the invention is extremely small, whose value being near to a value of the rubber specimen.

Figure 5:
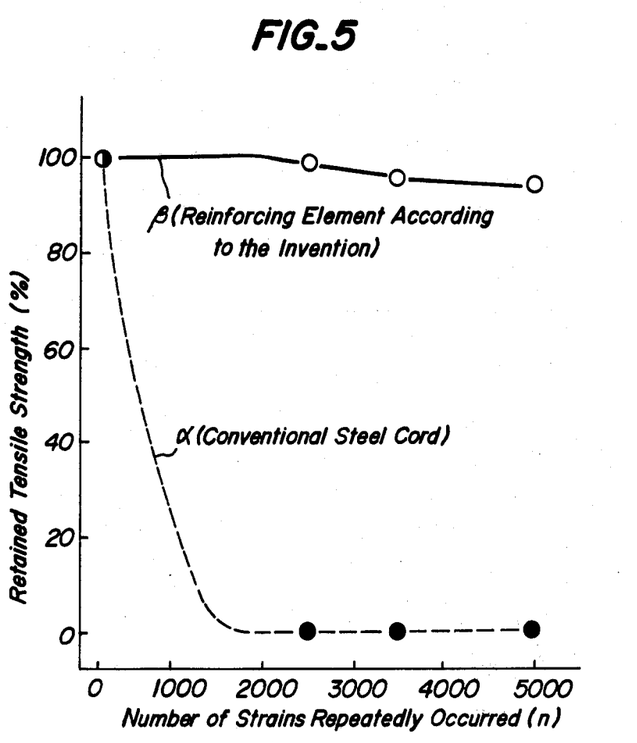
FIG. 5 is a graph illustrating compressive fatigue test results yielded from a reinforcing element according to the invention as compared with that yielded from a conventional steel cord.

FIG. 5 shows a compressive fatigue test result. A percentage of retained tensile strength after fatigue test vs original tensile strength, i.e. retained tensile strength in % is taken on the ordinate and number of strains repeatedly occurred in n is taken on the abscissa. In the present test, use was made of two test pieces, one being composed of a rectangular rubber body containing a plurality of conventional stranded steel cords embedded therein and the other being composed of a rectangular rubber body containing a plurality of bundles according to the invention embedded therein, and these test pieces were subjected to 5% repeating compressive strain with constant amplitude and constant intervals.

In FIG. 5, a dotted lines curve α shows retained tensile strength as a function of the number of strains repeatedly occurred for the conventional stranded steel cord having a strand construction of 1×5, filament diameter φ of 0.25 mm and cord diameter of 0.68 mm and a full line curve β shows a relation similar to the dotted lines curve α for the reinforcing element of the additional reinforcing layer according to the invention composed of 5 steel helically formed filaments each having a filament diameter of φ of 0.25 mm, average diameter D of the outer contour of 0.95 mm, $$\frac{D\max}{D\min} = 1.25, \frac{D}{\phi} = 3.8$$

and pitch of 10.5 mm.

As seen from FIG. 5, the retained tensile strength of the reinforcing element of the additional reinforcing layer according to the invention is far superior to that of the conventional steel cord.

The configuration, construction and effect of the additional reinforcing layer composed of the reinforcing element having the above described configuration and construction will now be described.

Rubber which constitutes the additional reinforcing layer together with the reinforcing element, may be made of a rubber compound having a Shore A hardness at room temperature of 50° to 85°; 300% modulus of elasticity of 100 to 250 kg/cm²; and tensile strength of 150 to 250 kg/cm². It is preferable to use a soft rubber having a large elongation and capable of following the deformation of the reinforcing element. The use of rubber having a hardness and modulus of elasticity which are smaller than those of the coating rubber of the belt composed of the conventional steel cord and lying beneath the additional reinforcing layer ensures an excellent effect.

In order to attain the object of the invention, the direction along which the reinforcing element is arranged in the additional reinforcing layer is not so much related to inclined angles of the reinforcing element with respect to the equatorial line of the tire. But, the reinforcing element may be inclined by 10° to 75°, preferably 20° to 60° with respect to the equatorial line of the tire. In order to improve the cut resistant property of the tire, use may be made of at least two additional reinforcing layers. In this case, it is preferable to extend the reinforcing elements associated with one of these additional reinforcing layers in an opposite direction to the reinforcing elements associated with the other additional reinforcing layer. Such arrangement, however, is related to the construction and material of the underlying belt.

When the tire is inflated by applying the internal pressured therein, it is necessary to apply the smallest possible force to the additional reinforcing layer. For this purpose, the circumferential tensile rigidity of the additional reinforcing layer should be made smaller than that of the belt layer composed of the conventional steel cords, preferably smaller than ½ that of the latter.

In order to attain the above described purpose, the elongation and compression of the reinforcing element of the additional reinforcing layer are defined with respect to the steel cords contained in the underlying belt.

That is, it is preferable to use a reinforcing element having an elongation at tensile breaking strength which is at least 1.2 times, preferably 1.5 times the smallest elongation at tensile breaking strength of the steel cord for the underlying main belt layer, a modulus of elasticity of at most $5 \times 10^3$ kg/mm², preferably at most $4 \times 10^3$ kg/mm², and compressive modulus of elasticity which is at most 0.9, preferably at most 0.7 times smaller than the largest compressive modulus of elasticity of the steel cord for the underlying main belt layer.

The modulus of elasticity of the cord shall be understood to mean a value given by $$\frac{a}{b/100 \times s}$$

where "a" is tension in kg applied to a cord or reinforcing element bundle within an elastic limit in which elasticity thereof can be restored as shown, for example, in FIG. 3, "b" is an elongation in % produced in the cord or reinforcing element bundle and "s" is an effective cross-sectional area of the cord or reinforcing element bundle in mm².

It is advisable to change the rigidity of rubber constituting the additional reinforcing layer in a stepwise manner, that is, arrange a relatively hard rubber near the reinforcing element and superimpose about such rubber a soft rubber for the purpose of alleviating stress and strain to be subjected to the additional reinforcing layer. It is also advisable to use a highly elastic rubber in order to limit movement of each end portion of the reinforcing element for the purpose of preventing the separation failure of the tire.

The additional reinforcing layer is required to have a width which is sufficient to cover the tread center portion of the tire since occurrence of the cut failure is limited to the tread center portion, i.e. a width which is at least ⅛ times the tread width. If use is made of a wide additional reinforcing layer, such layer may be divided into several layer portions and these layer portions may be separated one from the other along the widthwise direction thereof for the purpose of alleviating strain to be produced in each edge portion of the reinforcing element. In this case, gaps will be formed at the tread center portion, but the presence of such gaps having a width which is so narrow that the presence thereof does not substantially reduce the cut preventive effect of the reinforcing element is not objectionable. If the width of the additional reinforcing layer is made wider than that of the underlying belt layer, it is possible to protect each edge portion of the latter. In addition, it is preferable to superimpose about the additional reinforcing layer a rubberized layer containing cords formed of organic fiber such as nylon, etc. for the purpose of improving rust preventive property and recap property of the tire, particularly when the reinforcing elements of the additional reinforcing layer are formed of steel.

In addition, the bundle of helically formed filaments for constituting the reinforcing element of the additional reinforcing layer is not formed by twisting together the helically formed filaments as in the case of the conventional steel cord, but is formed by merely assembling these filaments together without twisting at random. As a result, a sufficiently large amount of rubber can be penetrated into gaps formed between the filaments of the bundle, so that insufficient chemical rubber-to-filament bonding force can sufficiently be compensated by the mechanical bonding force. Even when a portion of the rubber-to-filament bonding becomes separated from each other by cuts, there is no risk of such separated portion being extended to any other portions, thereby exhibiting an excellent cut separation resistant property.

The helically formed filament may be formed of wire material having a good rubber-to-filament bonding property, brass plated steel filament, glass fiber, metal filaments, aromatic polyamide having a high modulus of elasticity and the like, all of these materials satisfying the above described requirements.

A radial tire for heavy-load and off-road vehicles according to the invention will now be described with reference to practical examples.

EXAMPLE 1

Figure 6:
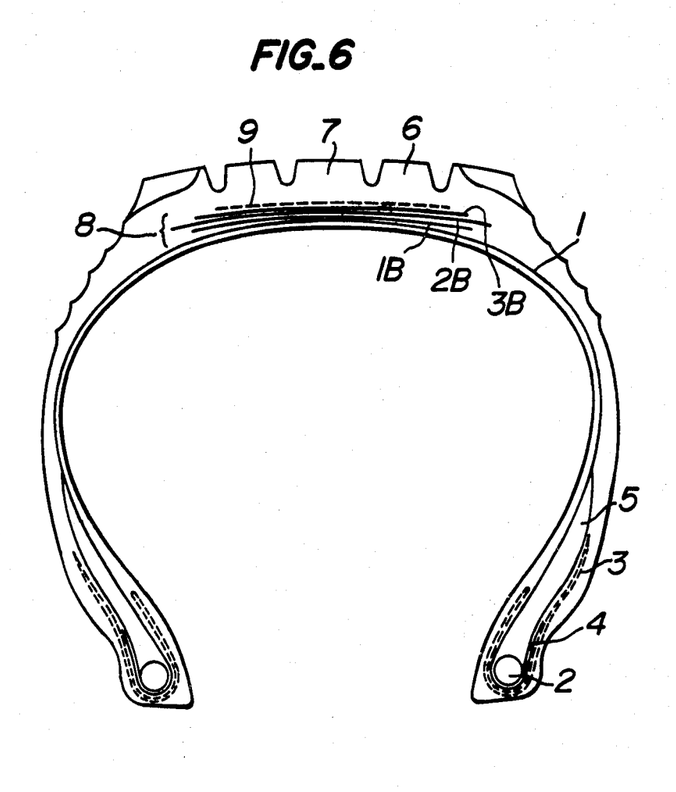
FIG. 6 is a cross-sectional view showing a tire of one embodiment according to the invention, parts being shown in vertical center section through the rotational axis of the tire.

FIG. 6 shows a cross-section of a tire, parts being shown in vertical center section through the rotational axis of the tire. The tire shown in FIG. 6 is of a radial tire for a truck and bus having a size of 10.00 R 20 14 PR.

A toroidal-shaped carcass ply 1 is composed of a stranded steel cord of $\{(1\times 3)\times 0.15 \text{ mm}+(5\times 7)\times 0.15 \text{ mm}+1\times 0.15 \text{ mm}\}$. The cords thereof are arranged in parallel with the radial direction of the tire, the number of cords per 25 mm at the crown center being 9. The tensile breaking strength of this steel cord is 170 kg/cord. The carcass ply 1 is composed of one rubberized cord ply wound about a pair of bead cores 2. About these bead cores 2 are wound a chafer 3 composed of a rubberized cord formed of nylon of 1,890 denier/2 strands.

In a triangular-shaped portion surrounded by the carcass ply 1, bead core 2 and a turn-up portion 4 of the carcass ply is disposed a bead filler 5 formed of a hard rubber having a Shore A hardness of 80°. In a crown portion 6 between the carcass ply 1 and a tread 7 are interposed a belt 8 composed of 3 reinforcing plies and one additional reinforcing layer 9.

The belt 8 is arranged at the carcass side, while the additional reinforcing layer 9 is arranged at the tread side. The 3 reinforcing plies of the belt 8 are designated by 1B, 2B and 3B, respectively, in the order viewed from the carcass side, the detailed construction of which being as follows.

perpendicular to the axial direction of one pitch of 0.95 mm, $$\frac{D\text{max}}{D\text{min}} = 1.25, \frac{D}{\phi} = 3.8$$

and pitch of 10.5 mm. The reinforcing element 30 is formed of 5 helically formed steel filaments 31. The number of the reinforcing elements 30 per 25 mm is 8. The cord angle of the reinforcing elements 30 with respect to the equatorial line of the tire is 25°. The reinforcing element 30 has a tensile breaking strength of 70 kg/cord, elongation at breaking strength of 5.5% and modulus of elasticity of 1,800 kg/mm².

The coating rubber 32 covering the reinforcing element has a Shore A hardness of 67°, 300% modulus of elasticity of 134 kg/cm² and elongation at breaking strength of 430%. The coating rubber 32 has a thickness of 0.85 mm and is coated on each side of the reinforcing element 30 with a finished thickness of 1.9 mm. The additional reinforcing layer has a width of 120 mm.

Figure 6A:
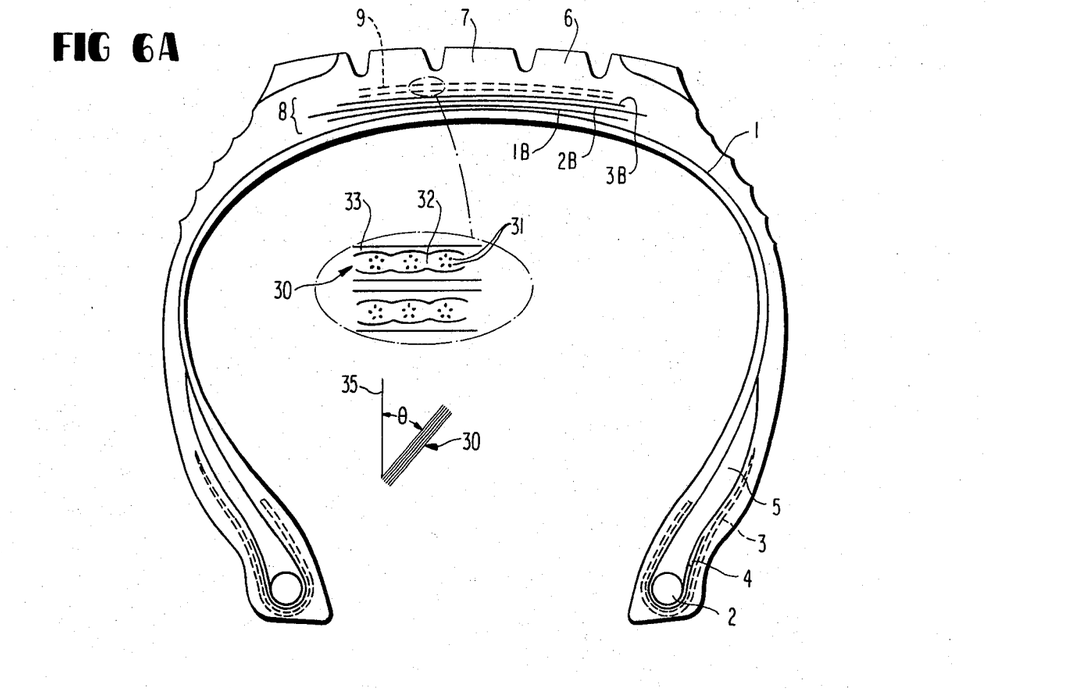
FIG. 6A is a cross-sectional view showing a tire of another embodiment to the invention, parts being shown in vertial section through the rotational axis of the tire.
Figure 6B:
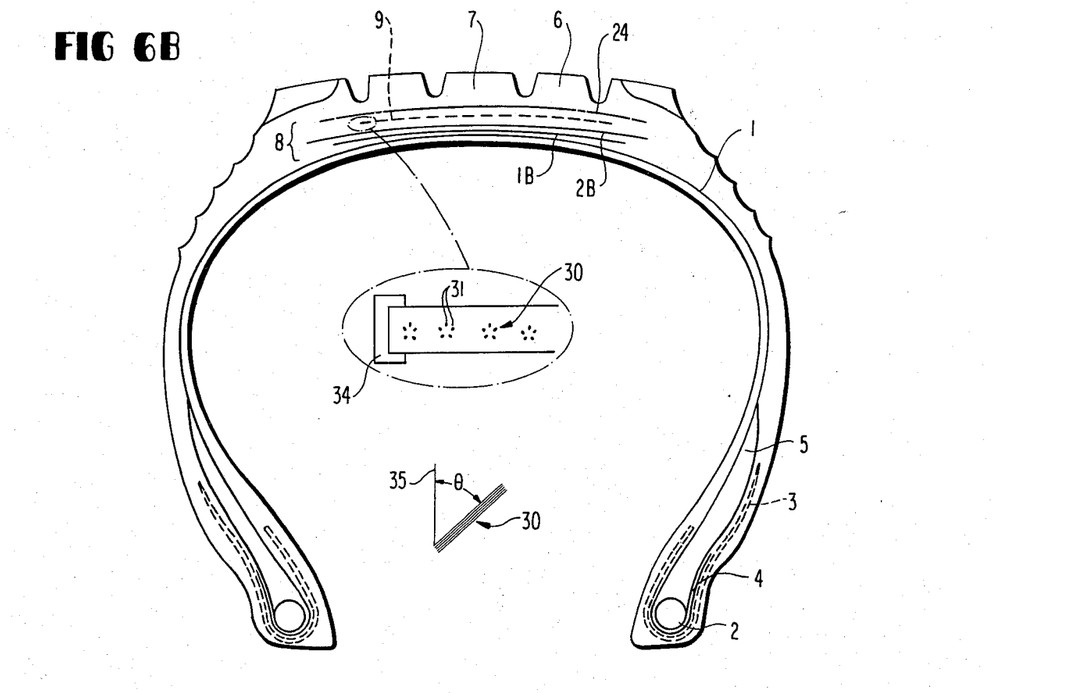
FIG. 6B is a cross-sectional view showing a tire of yet another embodiment according to the invention, parts being shown in vertical section through the rotational axis of the tire.

The coating rubber as shown in the blown-up view of FIG. 6A has a hard rubber element 32 in contact with the steel filaments 31 and a soft rubber element 33 superimposed about element 32. FIG. 6B shows a different construction with the belt layer 8 comprising a metal cord plies. The additional rubberized reinforcing layer 30 has its edge portion covered and tightened by a hard rubber 34. A rubberized textile ply 24 having nylon cord is superimposed about the additional reinforcing layer 9. In FIGS. 6A and 6B, the cord angle of the reinforcing elements 30 relative to the equatorial line 35 is also shown.

Figure 7:
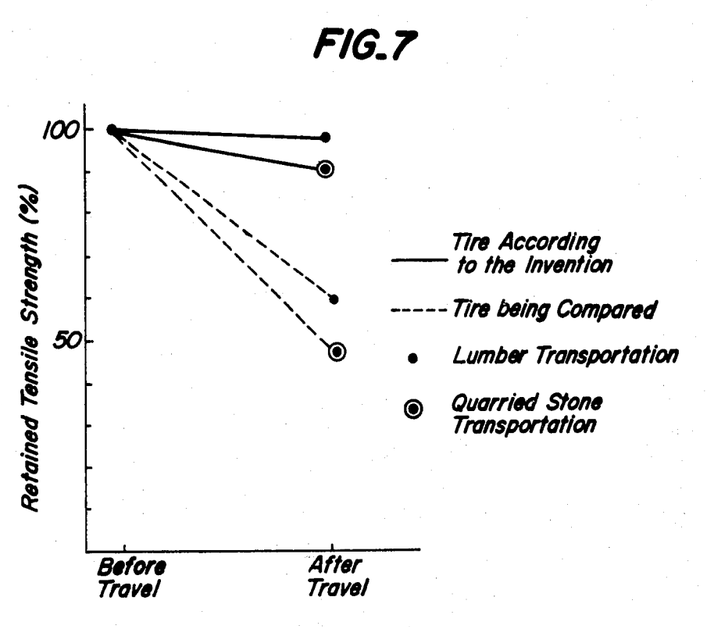
FIG. 7 is a graph illustrating test results of retained tensile strength of the tire shown in FIG. 6 as compared with those of the conventional tires.

FIG. 7 shows test results of the retained tensile strength in % as function of running distance of the tire according to the invention shown in FIG. 6 as compared with those of a conventional tire whose additional reinforcing layer makes use of the same steel cord as that of the belt 8.

In FIG. 7, the retained tensile strength in % is taken on the ordinate and the running distance is taken on the abscissa.

| Steel cord | Tensile breaking strength (kg/cord) | Elongation at breaking strength (%) | Cord angle | Width (mm) | Number of cords per unit length (mm) |
|---|---|---|---|---|---|
| 1B (1 × 3) × 0.15mm + (1 × 6) × 0.38mm | 168 | 3 | 60° toward right | 150 | 8/25 |
| 2B (1 × 3) × 0.15mm + (1 × 6) × 0.38mm | 168 | 3 | 20° toward right | 170 | 14/25 |
| 3B (1 × 3) × 0.15mm + (1× 6) × 0.38mm | 168 | 3 | 20° toward left | 147 | 14/25 |

The cord angle shall be understood to mean an angle inclined with respect to the equatorial line of the tire.

The coating rubber of the belt 8 has a Shore A hardness of 78°, elongation at tensile breaking strength of 380%, and 300% modulus of elasticity of 170 kg/mm². Each of the reinforcing plies of the belt 8 is coated at its both sides with the rubber in a thickness of 0.85 mm to form a rubber coating having a finished thickness of 2.0 mm.

The additional reinforcing layer 9, shown in the blown-up view at the center of the figure is composed of one rubberized reinforcing element 30 formed of a bundle of helically formed steel filaments 31.

Each helically formed steel filament 31 has a diameter $\phi$ of 0.25 mm, average diameter D projected on a plane In order to obtain the experimental test results shown in FIG. 7, both tires to be tested were travelled on road with lumbers and quarried stone carried, an average load being 150%. The number of tires tested was 12. In the case of transporting lumber, the tires were tested after running of 80,000 km, while in the case of transporting quarried stone, the tires were tested after running of 30,000 km.

As seen from FIG. 7, the tires according to the invention shown by full line curves are suitable for heavyload and off-road vehicles than the conventional tire shown by dotted lines curves.

In the case of transporting lumber, both the tires to be tested became completely worn after travel of about 100,000 km. In this case, the fourth belt of the tires being compared became broken due to the cord fatigue, so that about 70% thereof could be remolded. On the contrary, 100% of the worn tire according to the invention could be remolded.

A number of cut separations occurred in the tire being compared when used for transportation of quarried stone. The number of those tires which became useless waste tires is as follows.

| Tire being compared | Tire according to the invention |
| --- | --- |
| Completely worn 6 | 11 |
| Cut penetration 2 | 1 |
| Cut separation 4 | — |
| Side cut — | — |

EXAMPLE 2

Figure 8:
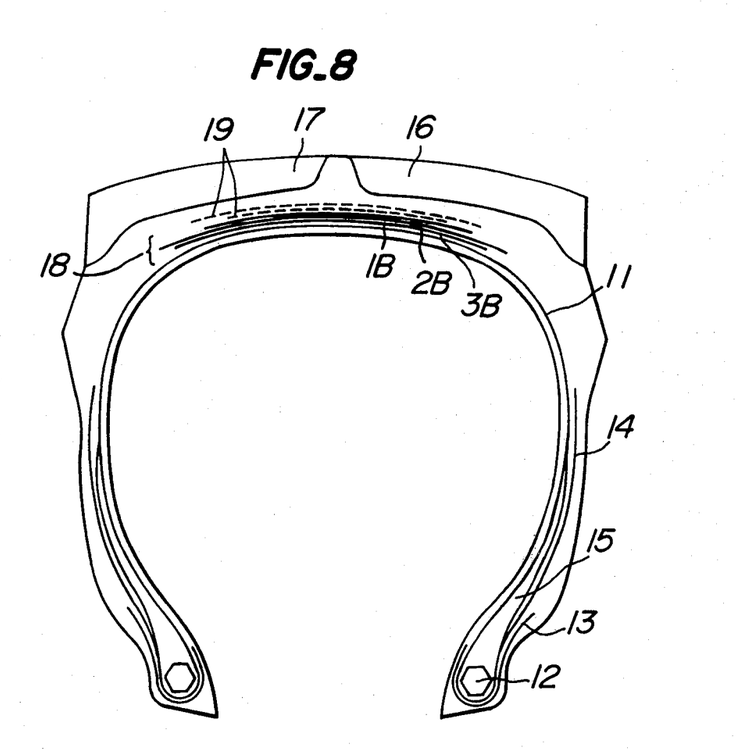
FIG. 8 is a cross-sectional view showing a tire of another embodiment according to the invention, parts being shown in vertical center section through the rotational axis of the tire.
Figure 9:
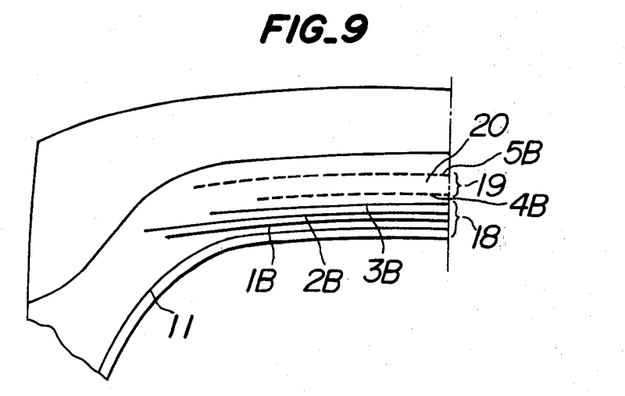
FIG. 9 is a part of FIG. 8 in an enlarges scale.

FIG. 8 shows a cross-section of a tire of another embodiment according to the invention, parts being shown in vertical center section through the rotational axis of the tire. FIG. 9 shows its crown portion in detail. The tire shown in FIGS. 8 and 9 is of a radial tire for construction vehicles having a size of 21.00 R35, 36Pr, E-3.

A carcass ply 11 is composed of a stranded steel cord of {(1×3)×0.18 mm+9×0.18 mm+(9×4)×0.18 mm+0.18 mm}. The cords thereof are arranged in parallel with the radial direction, the number of cords per 25 mm at the crown center being 4.5. The tensile breaking strength of this steel cord is 310 kg/cord. The carcass ply 11 is of toroidal-shape and would about a pair of bead cores 12, the turn-up portion 14 thereof extending toward the crown portion of the tire for a long distance. In order to reinforce the bead portion, a rubberized chafer 13 formed of the same steel cord as that of the carcass ply 11 is wound about the bead portion. The steel cord of the chafer 13 is inclined at an angle of 60° with respect to the equatorial line of the tire. In a triangular-shaped portion surrounded by the carcass ply 11, bead core 12 and turn-up portion 14 of the carcass ply is disposed a bead filler 15 formed of a hard rubber having a Shore A hardness of 84°. In a crown portion 16, between the carcass ply 11 and a tread 17 are interposed a belt 18 composed of 3 reinforcing plies and 2 additional reinforcing layers 19. Between these 2 additional reinforcing layers 19 is interposed a rubber sheet 20.

The belt 18 is arranged at the carcass side, while the additional reinforcing layer 19 is arranged at the tread side. The 3 reinforcing plies of the belt 18 are designated by 1B, 2B and 3B, respectively, in the order viewed from the carcass side, the detailed construction of which being as follows.

and elongation at tensile breaking strength of 310%. The reinforcing ply 1B of the belt 18 is coated at its both sides with the rubber in a thickness of 1.25 mm to form a rubber coating having a finished thickness of 3.2 mm. Each of the reinforcing plies 2B, 3B of the belt 18 is coated at its both sides with rubber in a thickness of 1.20 mm to form a rubber coating having a finished thickness of 3.25 mm.

The additional reinforcing layer 19 is composed of 2 rubberized plies each containing a reinforcing element embedded therein and formed of a bundle of helically formed steel filaments.

The helically formed steel filament has a diameter $\phi$ of 0.23 mm, average diameter D projected on a plane perpendicular to the axial direction of one pitch of 2.07 mm, $$\frac{D\max}{D\min} = 1.5, \frac{D}{\phi} = 9.0$$

and pitch of 11.7 mm. The reinforcing layer is composed of a rubberized layer containing a reinforcing element formed of 21 helically formed filaments. The number of the reinforcing elements per 25 mm is 8. The cord angles of the reinforcing elements with respect to the equatorial line of the tire is 27°. The reinforcing element has a tensile breaking strength of 170 kg/cord, elongation at breaking strength of 7% and modulus of elasticity of 1,500 kg/mm².

The coating rubber covering the additional reinforcing element is of two layers construction. One of the two coating rubber layers which makes contact with the additional reinforcing element is formed of a relatively hard and less extensible rubber having a Shore A hardness of 76°, 300% modulus of elasticity of 200 kg/cm² and elongation at breaking strength of 310% and the other coating rubber layer which is superimposed about the above described coating rubber layer is formed of a relatively soft and easily extensible rubber having a Shore A hardness of 67°, 300% modulus of elasticity of 134 kg/cm² and elongation at breaking strength of 430%.

The coating rubber has a thickness of 1.45 mm and is coated on each side of the reinforcing element with a finished thickness of 3.5 mm. The reinforcing layer located near the belt 18 has a width of 245 mm and the reinforcing layer superimposed about such reinforcing layer has a width of 320 mm. Between these two reinforcing layers is interposed a sheet rubber 20 having a thickness of 1.0 mm and a width of 450 mm. The sheet rubber 20 is formed of a relatively soft and easily extensible rubber having the same physical property as that of the coating rubber covering the outside of the reinforcing element.

The tire according to the invention was applied to a 50 ton dump truck which travels at a mine site where the tire is liable to be subjected to the cut separation

| Steel cord | Tensile breaking strength (kg/cord) | Elongation at breaking strength (%) | Cord angle | Width (mm) | Number of cords per unit length (mm) |
| --- | --- | --- | --- | --- | --- |
| 1B (7 × 7) × 0.21mm + 0.21mm | 410 | 2.6 | 40° | 360 | 8/25 |
| 2B (7 × 7) × 0.25mm + 0.25mm | 560 | 3.3 | 23° | 400 | 8/25 |
| 3B (7 × 7) × 0.25mm + 0.25mm | 560 | 3.3 | 23° | 290 | 8/25 |

The coating rubber of the belt 18 has a Shore A hardness of 76°, 300% modulus of elasticity of 200 kg/cm², failure and the cut resistant property thereof was compared with that of a conventional tire whose additional reinforcing layer portion has the following construction.

| Steel cord | Elongation at breaking strength (%) | Cord angle | Width (mm) | Number of cords per unit length (mm) |
|---|---|---|---|---|
| (3 × 7) × 0.23mm | 3.0 | 27° | 245 | 8/25 |
| (3 × 7) × 0.23mm | 3.0 | 27° | 320 | 8/25 |

The coating rubber of the additional reinforcing layer portion of the conventional tire has a Shore A hardness of 76°, 300% modulus of elasticity of 200 kg/cm$^2$ and elongation at tensile breaking strength of 310%. The coating rubber has a thickness of 1.1 mm coated at both sides of the additional reinforcing layer portion and a finished thickness of 2.6 mm. No rubber sheet is interposed between the plies 4B, 5B of the additional reinforcing layer 19.

The tire being compared was subjected to cut separation failure after a running time of 1,500 hours with RTD (retained tread depth) ¼ of 10 mm to 13 mm remained. On the contrary, the tire according to the invention was subjected to substantially no cut separation failure even after a running time of 2,300 hours until RTD¼ of 2 to 3 mm. The cut separation failure induced in the tire according to the invention is very minute contrary to the considerably large cut separation failure induced in the conventional tire. In addition, the useless waste tire caused by the cut failure extended through the tread was relatively small in number. A decrease of the cut burst results in an unexpected result. This is due to the fact that the stress is alleviated by the presence of the elongation and hence the belt is not broken at a time.

The test results produced from 20 useless waste tires are as follows.

|  | Tire according to the invention | Tire being compared |
|---|---|---|
| Completely worn | 7 | 1 |
| Cut penetration | 1 | 2 |
| Cut burst | 0 | 3 |
| Side cut | 2 | 1 |
| Cut separation | 0 | 3 |
| Average life | 2,200 hours | 1,350 hours |

"Peeling resistance" which has widely been used in place of the separation resistant property of the tire according to the invention and that of the tire being compared are shown in the following Table.

| Tread reinforcing layer | Peeling Resistance (kg/25mm) | | | |
|---|---|---|---|---|
| | Tire being compared | | Tire according to the invention | |
| | Room temperature | High temperature | Room temperature | High temperature |
| | 65 | 42 | 110 | 90 |

In the present test, use was made of a test piece taken out of the crown center portion of the finished tire and having a width of 25 mm and circumferential length of 250 mm. The peeling resistance were measured at room temperature and a high temperature of 100° C. for 2 hours. The tires tested are of the tires described above in the present example 2. Static tests have also demonstrated the result that the peeling resistance of the tire according to the invention is greater than that of the tire being compared.

EXAMPLE 3

Figure 10:
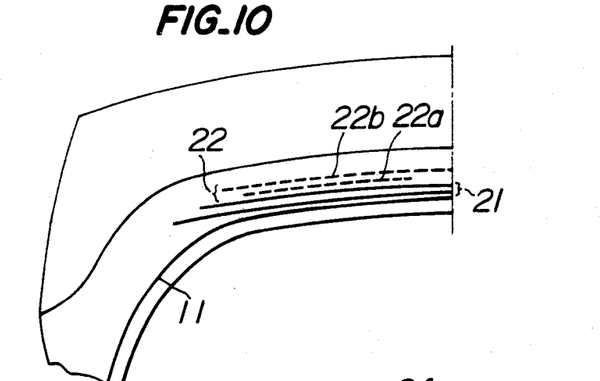
FIGS. 10, 11 and 12 are cross-sectional views showing modified embodiments of the tire according to the invention, parts being shown in vertical center section through the rotational axis of the tire.

FIG. 10 shows a cross-section of a crown portion of a tire of another embodiment according to the invention.

In the present embodiment, a belt 21 is composed of 2 plies each formed of the conventional steel cord and extending along two different directions symmetrically inclined at an angle of 20° with respect to the equatorial line of the tire.

About the belt 21 are superimposed 2 additional reinforcing layers 22 each composed of a reinforcing element formed of the above described helically formed steel filaments. An additional reinforcing layer 22a which makes contact with the belt 21 is divided into two portions at the crown center portion in radial direction. The other additional reinforcing layer 22b superimposed about the additional reinforcing layer 22a is of continuous one.

Experimental tests have shown that the tire of the present embodiment constructed as above described has a cut resistant property and cord fatigue due to compression which are far superior to those of the tire being compared described in the example 1. One portion of the additional reinforcing layer 22a is spaced apart from another portion thereof by 15 mm.

EXAMPLE 4

Figure 11:
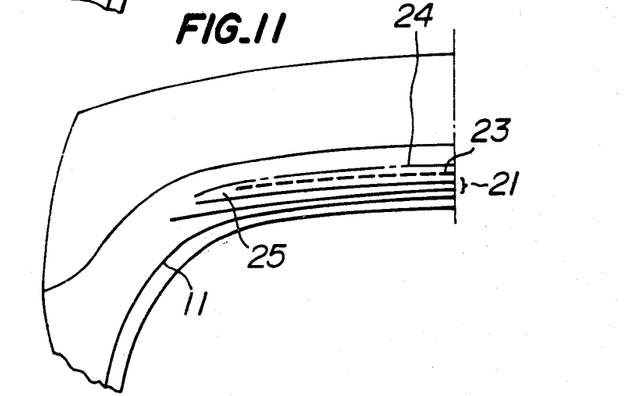

FIG. 11 shows a cross-section of a crown portion of a tire of a further embodiment according to the invention.

In the present invention, about the belt 21 composed of 2 rubberized plies each containing the conventional steel cord embedded therein as in the case of the example 3 is superimposed one rubberized additional reinforcing layer 23 composed of one rubberized ply containing reinforcing element formed of helically formed steel filaments. Each edge portion 25 of the additional reinforcing layer 23 is covered with and tightened by a hard rubber having a Shore A hardness of 76°, elongation at tensile breaking strength of 350% and 300% modulus of elasticity of 170 kg/cm$^2$. About the additional reinforcing layer 23 one rubberized textile ply 24 containing nylon cord embedded therein of 1,890 denier/2 strand is superimposed. The rubberized textile ply 24 has a cord angle of 35° inclined with respect to the equatorial line of the tire. The number of nylon cords per 25 mm is 17.

The present embodiment functions to prevent the additional reinforcing layer 23 from being displaced and hence improve the separation resistant property of the tire.

EXAMPLE 5

Figure 12:
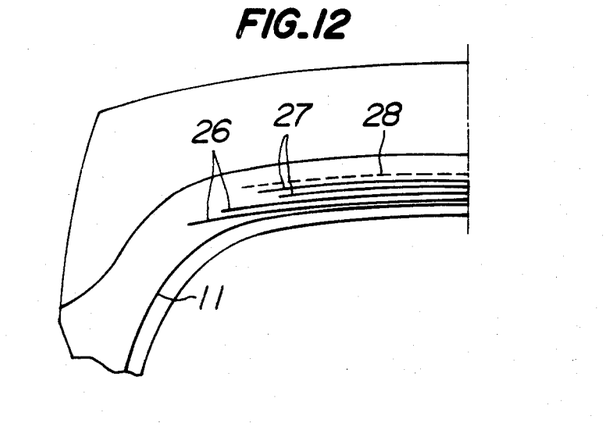

FIG. 12 shows a cross-section of a crown portion of a tire of a still further embodiment according to the invention.

In the present embodiment, a belt 26 is composed of 2 rubberized plies each containing the conventional steel cord embedded therein and having a construction shown in the following Table.

| Steel cord | Tensile breaking strength (kg/cord) | Elongation at breaking strength (%) | Cord angle | Number of cords per unit length (cords/25mm) |
|---|---|---|---|---|
| (7 × 7) × 0.21mm + 0.21mm | 410 | 2.6 | 20° | 8 |

A belt 27 is composed of 2 plies each containing totally stranded (S-S) steel cord embedded therein and having a construction shown in the following Table.

| Steel cord | Tensile breaking strength (kg/cord) | Elongation at breaking strength (%) | Cord angle | Number of cords per unit length (cords/25mm) |
|---|---|---|---|---|
| (3 × 7) × 0.23mm | 170 | 5.0 | 20° | 8 |

About the belt 27 is superimposed an additional reinforcing layer 28 containing a reinforcing element embedded therein and formed of the helically formed steel filaments having an elongation at breaking strength of 7.0% as described with reference to Example 2.

In the present embodiment, the elongation at the breaking strength is increased in a stepwise manner from the carcass 11 toward the tread.

As a result, the present embodiment functions to efficiently absorb shocks subjected to the tire and prevent the cords from being broken due to repeated bendings.

What is claimed is:

1. A tread reinforcing construction of a pneumatic radial tire, comprising a rubberized carcass ply composed of cords embedded therein and arranged substantially parallel with the radial direction of the tire, a rubberized belt superimposed about said rubberized carcass ply and arranged at a crown portion of the tire, said rubberized belt being composed of a plurality of metal cord plies each formed of conventional steel cords embedded therein and having a high rigidity in the circumferential direction, the width of said belt being greater than the width of the center portion of said tread portion, and at least one additional rubberized reinforcing layer interposed between said belt and a tread rubber portion, said reinforcing layer composed of a reinforcing element embedded therein and formed of a bundle of at least two helically formed filaments assembled together without twisting at random, said reinforcing element having a cord angle of between 10 degrees and 75 degrees, each of said helically formed filaments being made of steel, said reinforcing element having an elongation at tensile breaking strength which is at least 1.2 times larger than the smallest elongation at breaking strength of the metal cord plies constituting a main layer of said belt, and said additional reinforcing layer as a whole having a rigidity in the circumferential direction which is smaller than that of said belt.

2. A tread reinforcing construction according to claim 1, wherein said rubberized belt is composed of 3 metal cord plies embedded therein and each formed of conventional steel cord and said additional rubberized reinforcing layer is composed of one reinforcing layer formed of helically formed filaments.

3. A tread reinforcing construction according to claim 1, wherein said rubberized belt is composed of 3 metal cord plies embedded therein and each formed of conventional steel cord and said additional rubberized reinforcing layer is composed of 2 reinforcing layers each formed of said helically formed steel filaments, the coating rubber covering said reinforcing elements being of two layers, one of which makes contact with said additional reinforcing element and is formed of a relatively hard and less extensible rubber and the other coating rubber layer being superimposed about said coating rubber layer and being formed of a relatively soft and easily extensible rubber.

4. A tread reinforcing construction according to claim 1, wherein said rubberized belt is composed of 2 metal cord plies embedded therein and each formed of conventional steel cord and said additional rubberized reinforcing layer is composed of 2 reinforcing layers each formed of said helically formed steel filaments, one of said 2 reinforcing layers which makes contact with said belt being divided into two portions separated from each other at the crown center portion of the tire in the axial direction of the tire.

5. A tread reinforcing construction according to claim 1, wherein said rubberized belt is composed of 2 metal cord plies embedded therein each of which is formed of conventional steel cord and said additional rubberized reinforcing layer is composed of one reinforcing layer formed of said helically formed filaments, each edge portion of said additional reinforcing layer being covered with and tightened by a hard rubber, and said additional reinforcing layer being superimposed a rubberized textile ply having nylon cord embedded therein being superimposed about said additional reinforcing layer.

6. A tread reinforcing construction according to claim 1, wherein said rubberized belt is composed of 4 metal cord plies embedded therein and each formed of conventional steel cord and said additional rubberized reinforcing layer is composed of one reinforcing element layer formed of said helically formed filaments, the elongation at breaking strength of said 4 metal cord plies of said rubberized belt and of said layer of said additional rubberized reinforcing layer being gradually increased in a stepwise manner from the carcass toward the tread.

7. A tread reinforcing construction according to claim 1, wherein said helically formed filament is made of a material having a tensile breaking strength of 170 kg/mm$^2$.

8. A tread reinforcing construction according to claim 1, wherein said reinforcing element is formed of a bundle of 2 to 50 helically formed filaments assembled together without twisting at random and each having a diameter $\phi$ of 0.1 mm to 1.0 mm.

9. A tread reinforcing construction according to claim 1, wherein said reinforcing element has a cord angle of between 20 degrees and 60 degrees.

* * * * *